United States Patent
Chen (10) Patent No.: US 8,526,125 B2
(45) Date of Patent: Sep. 3, 2013

(54) LENS SYSTEM

(75) Inventor: Kuan-Ting Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 101 days.

(21) Appl. No.: 13/233,040

(22) Filed: Sep. 15, 2011

(65) Prior Publication Data

US 2013/0038951 A1    Feb. 14, 2013

(30) Foreign Application Priority Data

Aug. 11, 2011  (TW) .............. 100128667 A (51) Int. Cl.
*G02B 9/06*  (2006.01)
*G02B 13/18*  (2006.01)

(52) U.S. Cl.
USPC .......................................... 359/717; 359/794

(58) Field of Classification Search
USPC .................................. 359/694–794
See application file for complete search history.

(56) References Cited

U.S. PATENT DOCUMENTS 6,885,508 B2 * 4/2005 Yamaguchi et al. .......... 359/717
2010/0134903 A1 * 6/2010 Hirao et al. .................... 359/738
2010/0265362 A1 * 10/2010 Matsuo ....................... 348/240.3

FOREIGN PATENT DOCUMENTS

CN    101135767 A    3/2008

* cited by examiner

*Primary Examiner* — Scott J Sugarman
*Assistant Examiner* — Daniele Manikeu
(74) *Attorney, Agent, or Firm* — Altis Law Group, Inc.

(57) ABSTRACT

A lens system includes a first lens with positive refractive power and a second lens with positive refractive power, and an image plane. The first lens includes a first surface and a second surface from the object-side to the image-side of the lens system. The lens system satisfies the conditions: $D/TTL>1.18$; $1.5<F1/F<1.7$; $0.15<R2/(F1)^2<0.25$; wherein, D is a diameter of an effective imaging range of the image plane; TTL is a total length of the lens system, R2 is a radius of curvature of the second surface, F1 is a focal length of the first lens; F is a focal length of the lens system.

11 Claims, 8 Drawing Sheets

LENS SYSTEM

BACKGROUND

1. Technical Field

The disclosure relates to lens systems and, particularly, to a compact image lens system having a small number of lens components and a short overall length.

2. Description of Related Art

In many situations, a short overall length is demanded for use in a lens module for image acquisition. Such a lens module may be required for mounting in relatively thin equipment, such as simple digital cameras, webcams for personal computers, and portable imaging systems in general. In order to satisfy this demand, many lens systems reduce the number of lenses to shorten the overall length, but this will decrease the resolution. Increasing the number of lenses can increase resolution, but will also increase the overall length of the lens systems.

In a lens system, good image quality and a compact size is required for portability. A lens system with a short overall length and an optical performance that matches image sensing chips with enhanced resolution is desirable.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the disclosure will now be described in detail, with reference to the accompanying drawings.

Figure 1:
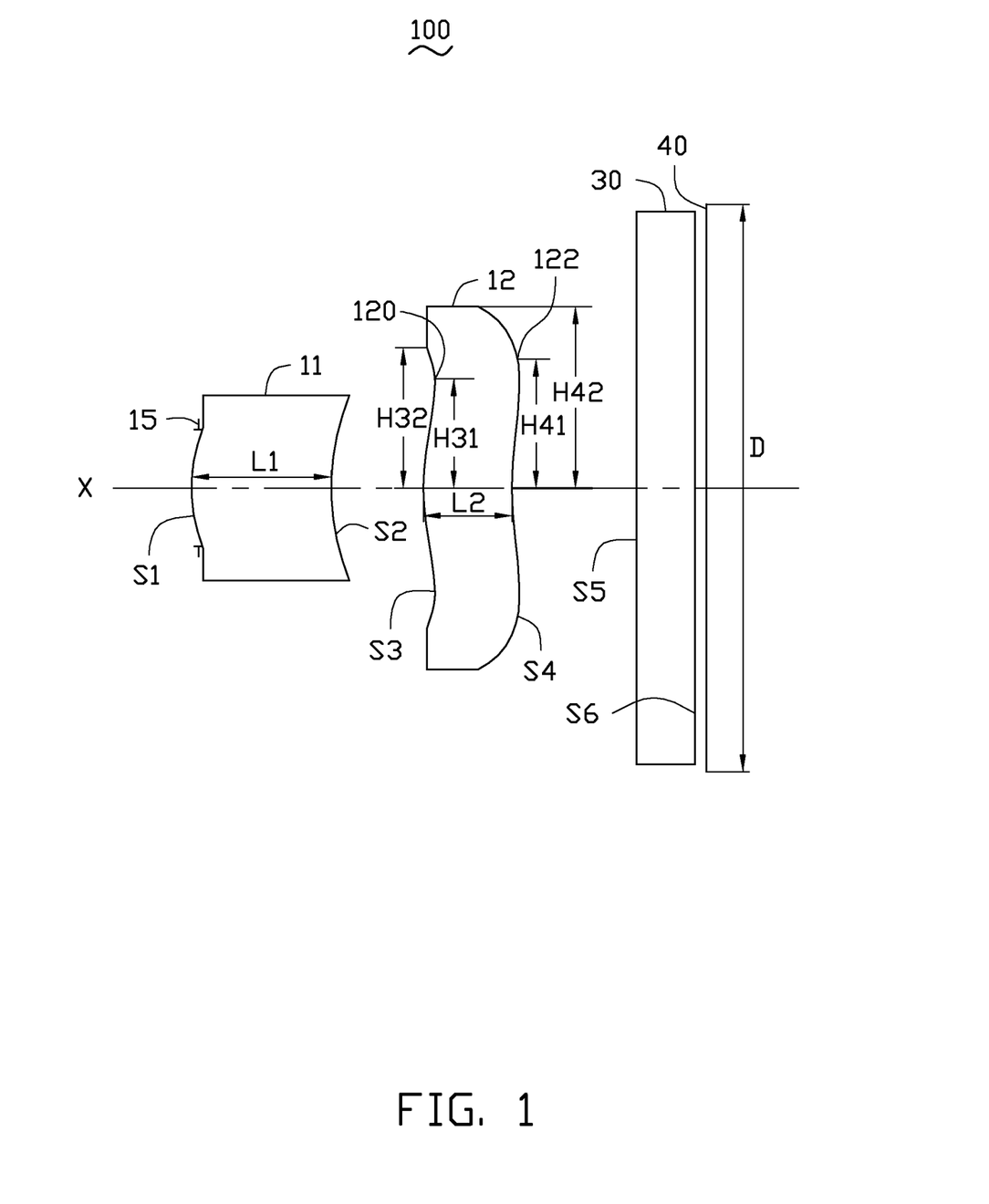
FIG. 1 is a sectional view of a lens system, according to a first exemplary embodiment.

Referring to FIG. 1, a lens system 100 according to a first embodiment, includes, in order from the object-side to the image-side of the lens system 100, a first lens 11 with positive refraction power, a second lens 12 with positive refraction power, a color filter 30, and an image plane 40.

In the first embodiment, the first lens 11 includes a first surface S1 and a second surface S2. The first surface S1 is on the object-side, the second surface S2 is on the image-side of the lens system 100. The first surface S1 is convex, facing out towards the object-side, and the second surface S2 is concave, facing in towards the image-side of the lens system 100, the first lens 11 therefore has the shape of a meniscus. The first surfaces S1 and second surfaces S2 are aspherical. The first lens 11 is made of plastic.

The lens system 100 further includes an aperture stop 15 installed close to the first surface S1 of the first lens 11. The aperture stop 15 is for adjusting the luminous flux from the first lens 11 to the second lens 12. In addition, the aperture stop 15 facilitates the uniform transmission of light when light is passing through the first lens 11, to correct chromatic aberrations of the lens system 100, and to minimize the cost of manufacture and the total length of the lens system 100.

The second lens 12 includes a third surface S3 and a fourth surface S4, from the object-side to the image-side of the lens system 100. The third surface S3 and the fourth surfaces S4 are aspherical. The portion of the third surface S3 which is close to the optical axis X of the lens system 100 is convex and faces out towards the object-side of the lens system 100, the portion of the fourth surface S4 which is close to the optical axis X of the lens system 100 is concave and facing in towards the image-side of the lens system 100. The second lens 12 is also made of plastic.

The color filter 30 includes, in order from the object-side to the image-side of the lens system 100, a fifth surface S5 and a sixth surface S6.

By reference to the following formulae, the lens system 100 complies with the conditions of short overall length and excellent optical performance, $$(1) D/TTL > 1.18;\ (2) 1.5 < F1/F < 1.7;\ (3) 0.15 < R2/(F1)^2 < 0.25;$$

Wherein: D is the diameter of an effective imaging range of the image plane 40; TTL is the total length of the lens system 100, R2 is the radius of curvature of the second surface S2, and F1 is the focal length of the first lens 11; F is the focal length of the lens system 100.

In obtaining low distortion, good imaging quality and a compact configuration, the lens system 100 is able to satisfy the following conditions:

$$(4) 0.5 < R4/F2 < 0.75;\ (5) 0.7 < H31/H32 < 0.85;\ (6) 0.6 < H41/H42 < 0.7;$$

Wherein: R4 is the radius of curvature of the fourth surface S4, F2 is the focal length of the second lens 12; H31 is the distance from the optical axis X of the lens system 100 to the innermost optically effective point 120 of the third surface S3 of the second lens 12; H32 is the vertical height of the optically effective portion of the third surface S3 of the second lens 12; H41 is the distance from the optical axis X of the lens system 100 to the outermost optically effective point 122 of the fourth surface S4 of the second lens 12; H42 is the vertical height of the optically effective portion of the fourth surface S4 of the second lens 12.

In the embodiment, the lens system 100 further satisfies the following condition:

$$(7) 1.25 < L1/L2 < 1.6;$$

Wherein: L1 is the distance along the optical axis of the lens system 100 from the first surface S1 to the second surface S2 of the first lens 11; L2 is the distance along the optical axis of the lens system 100 from the third surface S3 to the fourth surface S4 of the second lens 12.

In the embodiment, the lens system 100 further satisfies the following conditions:

$$(8) Vd1 > 50\ \text{and}\ Vd2 > 50.$$

Wherein: Vd1 is the Abbe number of the first lens 11; Vd2 is the Abbe number of the second lens 12.

These last two conditions (ie. as in (8)) relate to problems of image performance associated with any manufacturing errors in the lens system 100. When the conditions Vd1>50 and Vd2>50 are met, chromatic aberrations are effectively reduced and imaging performance is improved.

The first surface S1, the second surface S2, the third surface S3 and the fourth surface S4 are aspherical surfaces. These aspherical surfaces are shaped according to the formula:

$$Z = \frac{ch^2}{1 + \sqrt{1 - (k+1)c^2h^2}} + \sum A_i h^i$$

wherein, Z is the length of a line drawn from a point on the aspherical lens surface at a distance h from the optical axis to the tangential plane of the aspherical surface vertex, h is the height from the optical axis to the surface, c is a vertex curvature (=1/R, the radius of curvature), k is a conic constant, and Ai are the correction coefficients, to the order of "i" of the aspherical surfaces.

Certain graphs relating to the lens system 100 will be described, with reference to FIGS. 2-4. It is to be understood that the disclosure is not limited to these examples. The following are the symbols used in each exemplary embodiment.
 ri: radius of curvature of the surface Si;
 Di: distance between surfaces on the optical axis of the surface S1 and the surface Si+1;
 Ni: refractive index of the surface Si; and
 Vi: Abbe constant of the surface Si;
 Ki: Secondary curvature of the surface Si.

Tables 1-2 show the specifications of the first exemplary embodiment of the lens system 100.

TABLE 1

| Surface | ri(mm) | Di(mm) | ni | vi | ki |
|---|---|---|---|---|---|
| Aperture stop 15 | infinite | −0.026 | — | — | — |
| S1 | 0.567 | 0.497 | 1.53 | 55.8 | −26.9 |
| S2 | 0.835 | 0.190 | — | — | −12.1 |
| S3 | 0.750 | 0.317 | 1.53 | 55.8 | −25.8 |
| S4 | 1.466 | 0.441 | — | — | 0.21 |
| S5 | infinite | 0.21 | 1.517 | 64 | — |
| S6 | infinite | 0.01 | — | — | — |
| 40 | infinite | — | — | — | — |

TABLE 2

| Aspherical coefficient | Surface | | | |
|---|---|---|---|---|
| | S1 | S2 | S3 | S4 |
| A4 | 1.14E+01 | −6.01E−01 | 1.18E+00 | −1.14E+00 |
| A6 | −5.00E+01 | 4.91E+01 | −2.21E+01 | −5.92E−01 |
| A8 | −5.10E+03 | −3.75E+02 | 8.73E+01 | 4.20E+00 |
| A10 | 1.47E+05 | −1.01E+02 | −6.00E+01 | −2.97E+01 |
| A12 | −1.41E+06 | 2.15E+05 | −7.31E+02 | 8.22E+01 |
| A14 | 3.27E+06 | −9.44E+04 | 1.78E+03 | −9.15E+01 |
| A16 | — | — | — | — |

In the embodiment, the focal length of the first lens 11 (F1) is 2.02; the focal length of the second lens 12 (F2) is 2.5; the focal length of the lens system 100 (F) is 1.35.

Figure 2:
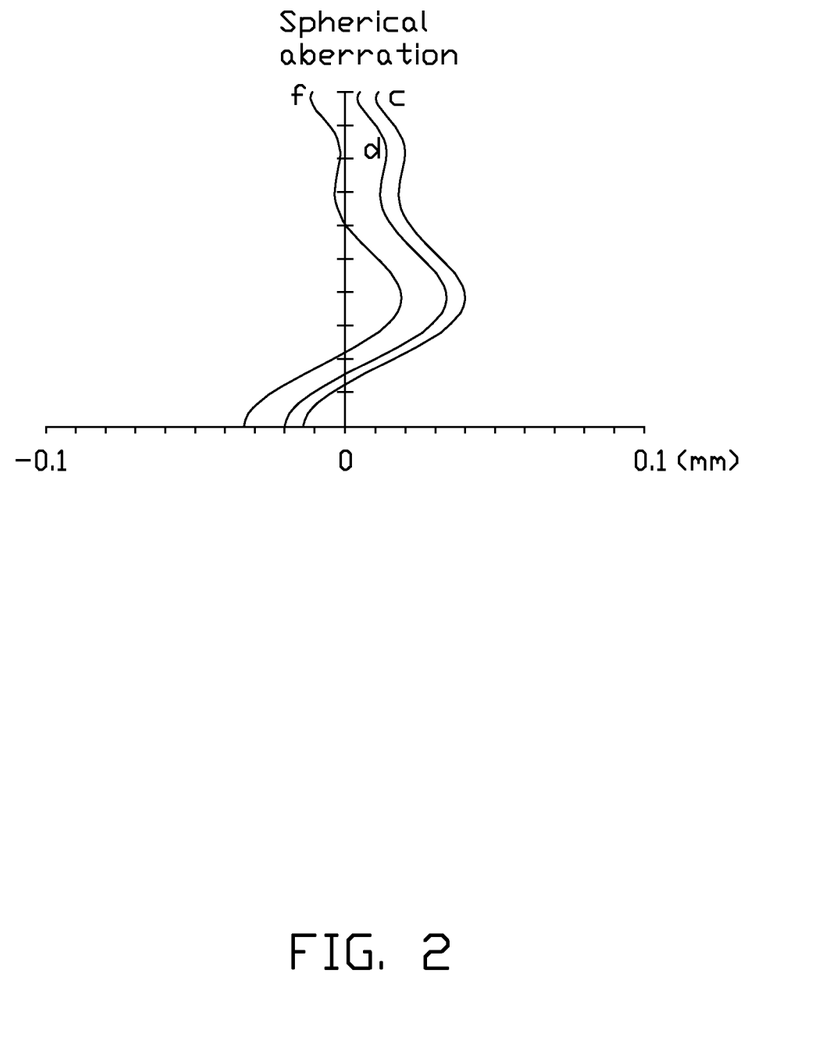
FIGS. 2~4 are graphs showing the spherical aberration, field curvature and distortion occurring in the lens system of FIG. 1.
Figure 3:
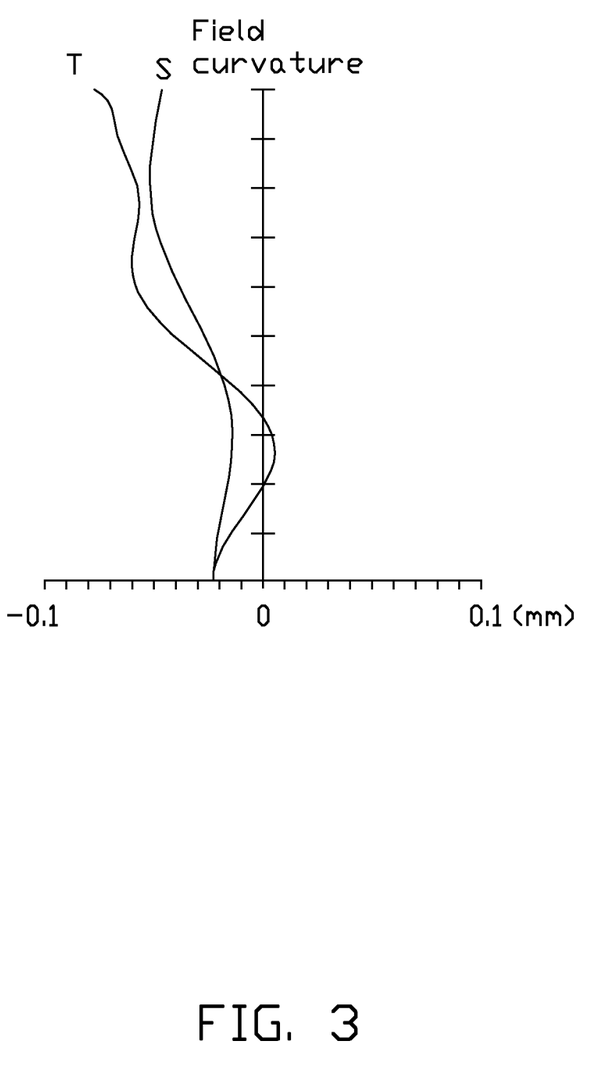
Figure 4:
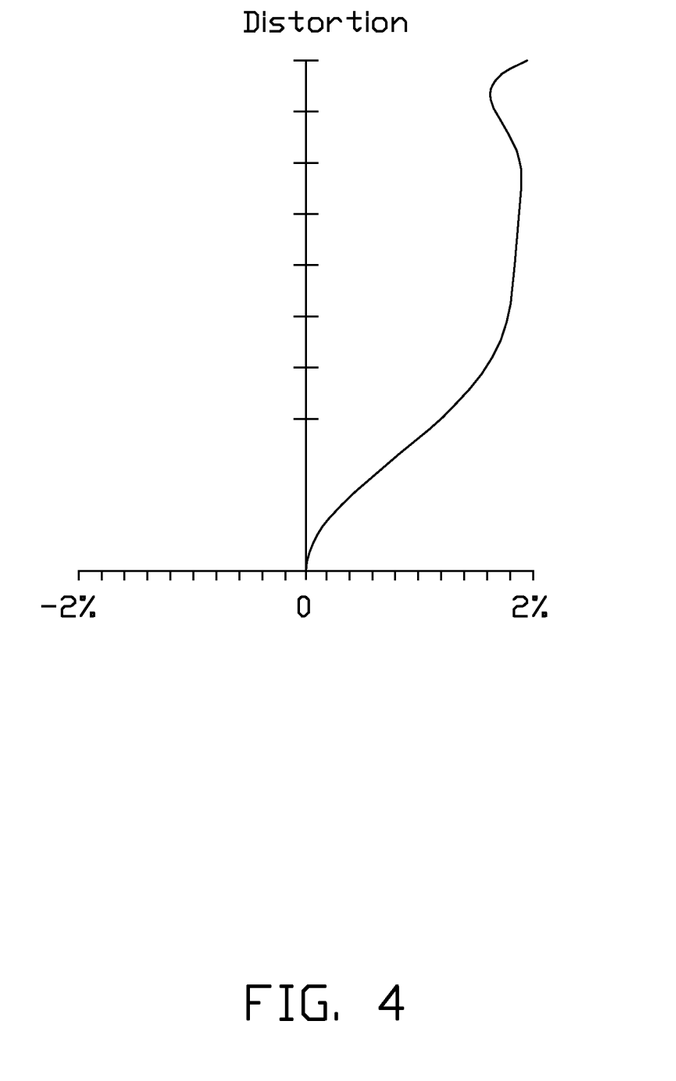

FIGS. 2-4, are graphs of the aberrations (spherical aberration, field curvature, distortion, and lateral chromatic aberration) of the first exemplary embodiment of the lens system 100. In FIG. 2, the curves are spherical aberration characteristic curves of light at a wavelength of 486.1 nanometers (486.1 nm) (=f), light at a wavelength of 587.6 nm (=d), and light at a wavelength of 656.3 nm (=c) of the lens system 100. The spherical aberrations of the lens system 100 of the first exemplary embodiment is from −0.1 mm to 0.1 mm. As illustrated in FIG. 3, the curves T and S are respectively the tangential field curvature curve and the sagittal field curvature curve. The field curvature of the first exemplary embodiment of the lens system 100 is from −0.1 mm to 0.1 mm. In FIG. 4, the distortion of the first embodiment of the lens system 100 is from −2% to 2%.

In the first exemplary embodiment, although the overall length of the lens system 100 is reduced, all aberrations of the lens system 100 are maintained within an acceptable range. That is, the lens system 100 keeps chromatic aberrations to a minimum while reducing the total length of the lens system 100.

Figure 5:
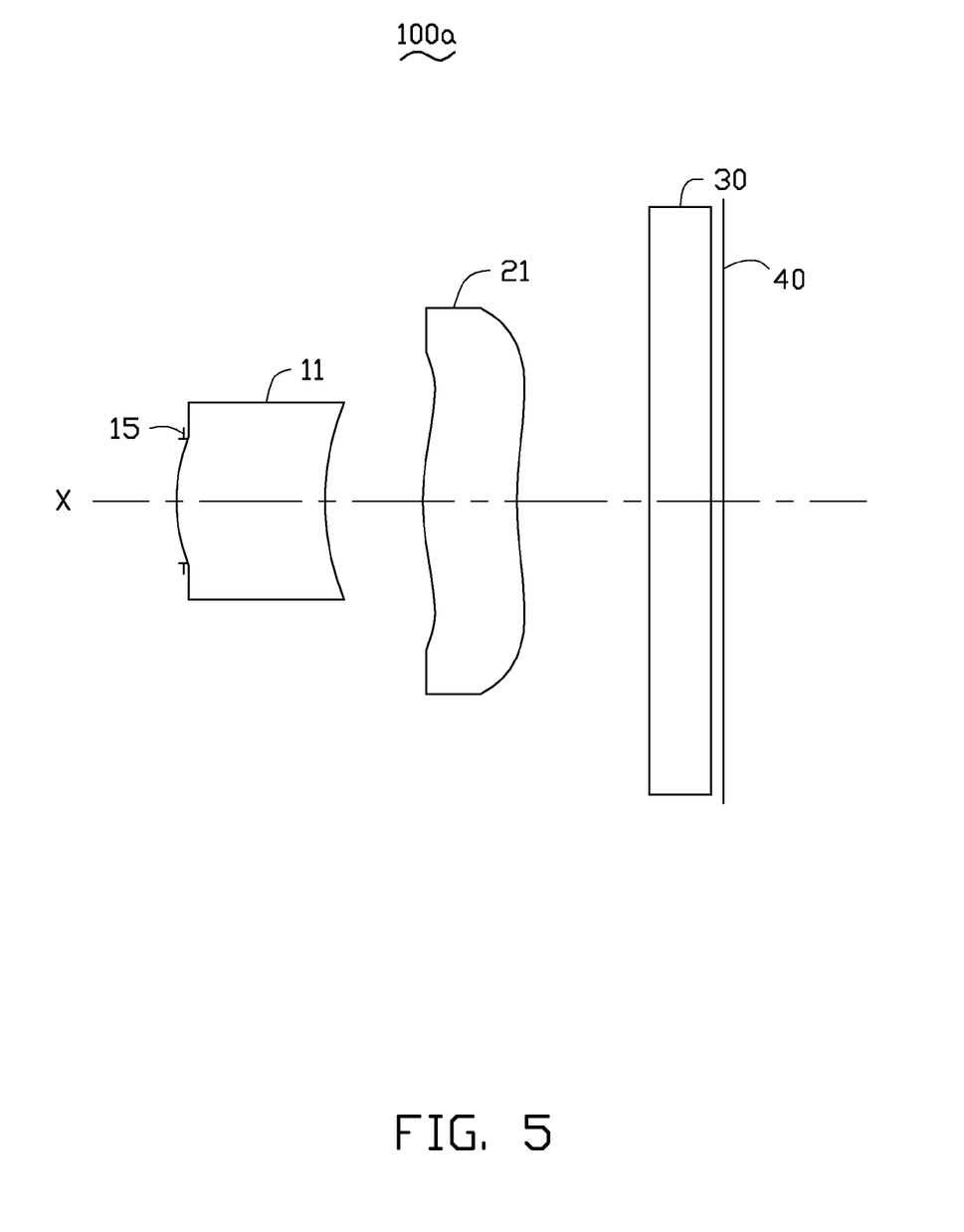
FIG. 5 is a sectional view of a lens system, according to a second exemplary embodiment.

Referring to FIG. 5, a lens system 100a of a second exemplary embodiment is similar to the lens system 100 of the first exemplary embodiment of FIGS. 1-4, except that the lens system 100a has specifications different from that of the lens system 100. Tables 3-4 show the specifications of the lens system 100a of FIG. 5.

TABLE 3

| Surface | ri(mm) | Di(mm) | Ni | vi | ki |
|---|---|---|---|---|---|
| Aperture stop 15 | infinite | −0.026 | — | — | — |
| S1 | 0.604 | 0.487 | 1.53 | 56 | −0.22 |
| S2 | 0.894 | 0.195 | — | — | −28.1 |
| S3 | 0.779 | 0.375 | 1.53 | 56 | −22.7 |
| S4 | 1.605 | 0.419 | — | — | −4.08 |
| S5 | infinite | 0.21 | 1.517 | 64 | — |
| S6 | infinite | 0.01 | — | — | — |
| 40 | infinite | — | — | — | — |

TABLE 4

| Aspherical coefficient | Surface | | | |
|---|---|---|---|---|
| | S1 | S2 | S3 | S4 |
| A4 | −1.18E+00 | 1.26E+00 | 3.67E−01 | −7.04E−01 |
| A6 | 6.42E+01 | 1.10E+01 | −8.60E+00 | −1.03E+00 |
| A8 | −1.80E+03 | −6.71E+01 | 6.87E+00 | 5.56E+00 |
| A10 | 2.64E+04 | 9.71E+01 | 4.73E+01 | −1.84E+01 |
| A12 | −1.80E+05 | 1.28E+03 | 1.81E+02 | 5.76E+00 |
| A14 | 4.36E+05 | −3.91E+03 | −1.11E+03 | 8.58E+01 |
| A16 | — | — | −6.23E+02 | −1.31E+02 |

Figure 6:
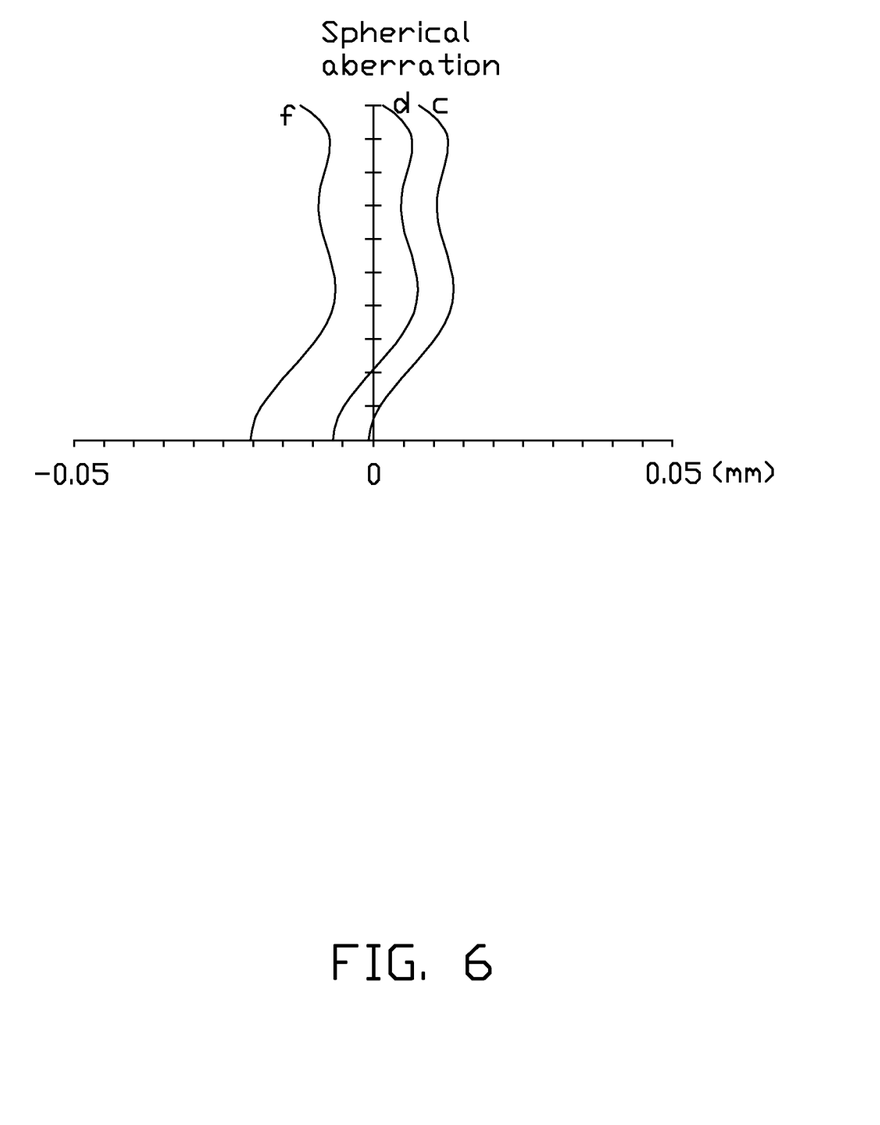
FIGS. 6~8 are graphs showing the spherical aberration, field curvature, distortion and lateral chromatic aberration occurring in the lens system of the FIG. 5.
Figure 7:
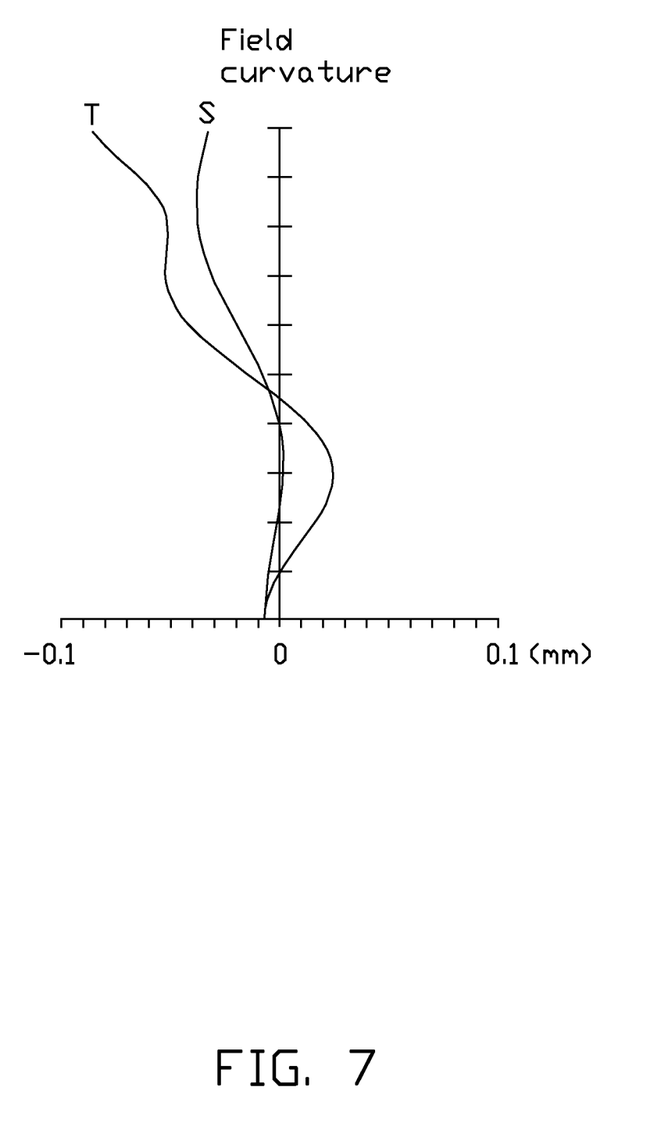
Figure 8:
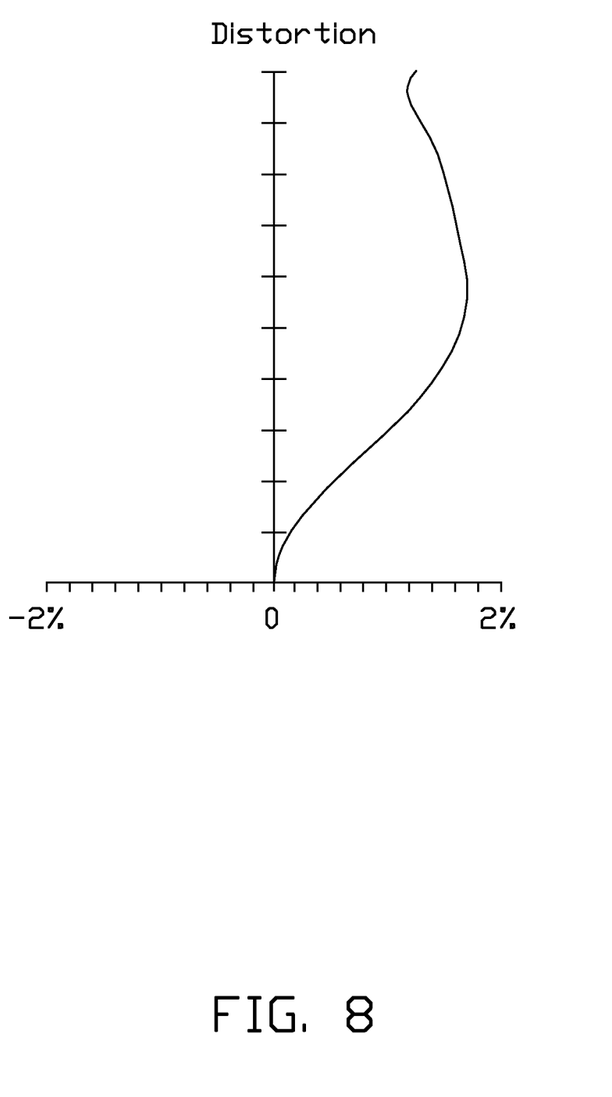

FIGS. 6-8, are graphs of the aberrations (spherical aberration, field curvature, distortion, and lateral chromatic aberration) of the second exemplary embodiment of the lens system 100a. In FIG. 6, the curves are spherical aberration characteristic curves of light at a wavelength of 486.1 nanometers (486.1 nm) (=f), light at a wavelength of 587.6 nm (=d), and light at a wavelength of 656.3 nm (=c) of the lens system 100a. The spherical aberrations of the lens system 100a of the second exemplary embodiment is from −0.05 mm to 0.05 mm. As illustrated in FIG. 7, the curves T and S are respectively the tangential field curvature curve and the sagittal field curvature curve. The field curvature of the second exemplary embodiment of the lens system 100a is from −0.1 mm to 0.1 mm. In FIG. 8, the distortion of the first embodiment of the lens system 100a is from −2% to 2%.

In the second exemplary embodiment, although the overall length of the lens system 100a is reduced, any aberrations of the lens system 100a are maintained within an acceptable range. That is, the lens system 100a keeps chromatic aberrations to a minimum while reducing the total length of the lens system 100a.

In the second exemplary embodiment, the focal length of the first lens 11 (F1) is 2.2; the focal length of the second lens 12 (F2) is 2.46; the focal length of the lens system 100a (F) is 1.34.

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope of the appended claims.

What is claimed is:

1. A lens system, in the order from the object-side to the image-side of the lens system, comprising:
   a first single lens having positive refraction power, the first lens, in order from the object-side to the image-side of the lens system, comprising a first surface and a second surface;
   a second single lens having positive refraction power; and
   an image plane;
   wherein the lens system satisfies the following conditions:

$$D/TTL > 1.18;\ 1.5 < F1/F < 1.7;\ 0.15 < R2/(F1)^2 < 0.25;$$

wherein, D is a diameter of an effective imaging range of the image plane; TTL is a total length of the lens system, R2 is a radius of curvature of the second single surface, F1 is a focal length of the first single lens; F is a focal length of the lens system.

2. The lens system of claim 1, further comprising an aperture stop, wherein the aperture stop is installed close to the first surface of the first lens.

3. The lens system of claim 1, wherein the first surface is convex facing out towards the object-side, and the second surface is concave facing in towards the image-side of the lens system, both the first surface and the second surface are aspherical.

4. The lens system of claim 1, wherein the second single lens, in order from the object-side to the image-side of the lens system, comprises a third surface and a fourth surface, the lens system further satisfies the conditions:

$$0.5 < R4/F2 < 0.75;\ 0.7 < H31/H32 < 0.85;\ 0.6 < H41/H42 < 0.7;$$

wherein, R4 is the radius of curvature of the fourth surface, F2 is the focal length of the second single lens; H31 is the distance from the optical axis of the lens system to the innermost optically effective point of the third surface of the second single lens; H32 is the vertical height of the optically effective portion of the third surface of the second single lens; H41 is the distance from the optical axis of the lens system to the outermost optically effective point of the fourth surface of the second single lens; H42 is the vertical height of the optically effective portion of the fourth surface of the second single lens.

5. The lens system of claim 4, wherein the portion of the third surface which is close to an optical axis of the lens system is convex facing out towards the object-side, and the portion of the fourth surface which is close to the optical axis of the lens system is concave facing in towards the image-side of the lens system.

6. The lens system of claim 4, wherein the lens system further satisfies the conditions:

$$1.25 < L1/L2 < 1.6;$$

wherein, L1 is the distance along the optical axis of the lens system from the first surface to the second surface of the first lens; L2 is the distance along the optical axis of the lens system from the third surface to the fourth surface of the second lens.

7. The lens system of claim 1, wherein the lens system further satisfies the conditions:

$$Vd1 > 50\ \text{and}\ Vd2 > 50;$$

wherein, Vd1 is the Abbe number of the first single lens; Vd2 is the Abbe number of the second single lens.

8. The lens system of claim 1, further comprising a color filter, wherein the color filter is arranged between the image plane and the second single lens.

9. The lens system of claim 1, wherein both the first single lens and the second single lens are made of plastic.

10. The lens system of claim 1, wherein the focal length of the first single lens is 2.02; the focal length of the second single lens is 2.5; the focal length of the lens system is 1.35.

11. The lens system of claim 1, wherein the focal length of the first single lens is 2.2; the focal length of the second 1 single lens is 2.46; the focal length of the lens system is 1.34.

* * * * *